US009310034B2

(12) United States Patent
Kessels

(10) Patent No.: US 9,310,034 B2
(45) Date of Patent: Apr. 12, 2016

(54) LIGHT EMITTING DEVICE FOR BACKLIGHT DEVICE AND METHOD OF OPERATING THE LIGHT EMITTING DEVICE

(71) Applicant: KONINKLIJKE PHILIPS N.V., Eindhoven (NL)

(72) Inventor: Marcus Jozef Henricus Kessels, Susteren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/371,520

(22) PCT Filed: Jan. 18, 2013

(86) PCT No.: PCT/IB2013/050480
§ 371 (c)(1),
(2) Date: Jul. 10, 2014

(87) PCT Pub. No.: WO2013/111039
PCT Pub. Date: Aug. 1, 2013

(65) Prior Publication Data

US 2014/0376263 A1 Dec. 25, 2014

Related U.S. Application Data

(60) Provisional application No. 61/590,393, filed on Jan. 25, 2012.

(51) Int. Cl.
*F21V 7/04* (2006.01)
*F21K 99/00* (2010.01)
(Continued)

(52) U.S. Cl.
CPC . *F21K 99/00* (2013.01); *F21K 9/50* (2013.01); *F21V 7/0083* (2013.01);
(Continued)

(58) Field of Classification Search
CPC ......... F21K 99/00; F21K 9/50; F21V 7/0083; G02B 6/29325; G02B 6/0031; G02B 6/0073; G02B 6/0068; G02F 1/133609; G02F 1/133603; G02F 1/133605; G02F 2001/133613; G02F 2201/52
See application file for complete search history.

(56) References Cited

U.S. PATENT DOCUMENTS 6,536,914 B2 3/2003 Hoelen et al.
7,364,343 B2 4/2008 Keuper et al.
(Continued)

FOREIGN PATENT DOCUMENTS

KR 20080080764 A 9/2008
WO 2009125313 A1 10/2009

*Primary Examiner* — Donald Raleigh

(57) ABSTRACT

A light emitting device (1) for illuminating a backlight device is provided. The device comprises an array (2) of light sources and at least one reflector (3*a*, 3*b*) arranged along an edge of the array (2) of light sources. The array is arranged with alternating first (4*a*, 5*a*) and second (4*b*, 5*b*) light sources, the first light sources (4a, 5a) emitting light of a first colour (G) and the second light sources (4*b*, 5*b*) emitting light of a second colour (P). The combined intensity of at least one light source (4*a*, 4*b*) arranged adjacent to the at least one reflector (3*a*, 3*b*) and its virtual image in the reflector is about 80-120% of the average intensity of the light sources (5*a*, 5*b*) of the same colour which are not arranged adjacent to the at least one reflector. The present invention further provides an edge lit or direct lit backlight device comprising such a light emitting device, the at least one reflector being at least one inner wall of the backlight device arranged along an edge of said array of light sources. A method of operating a light emitting device for illuminating a backlight device is also provided.

14 Claims, 2 Drawing Sheets

(51) Int. Cl.

| | |
|---|---|
| ***G02F 1/1335*** | (2006.01) |
| ***F21V 8/00*** | (2006.01) |
| ***G02B 6/293*** | (2006.01) |
| ***F21V 7/00*** | (2006.01) |

(52) U.S. Cl.
CPC ........... *G02B 6/0031* (2013.01); *G02B 6/0068* (2013.01); *G02B 6/0073* (2013.01); *G02B 6/29325* (2013.01); *G02F 1/133603* (2013.01); *G02F 1/133605* (2013.01); *G02F 1/133609* (2013.01); *G02F 2001/133613* (2013.01); *G02F 2201/52* (2013.01)

(56) References Cited

U.S. PATENT DOCUMENTS

| | | | | |
|---|---|---|---|---|
| 7,537,374 | B2 | 5/2009 | Schardt et al. | |
| 7,671,832 | B2 | 3/2010 | Lankhorst et al. | |
| 2008/0151527 | A1 | 6/2008 | Ueno et al. | |
| 2009/0097240 | A1 | 4/2009 | Egawa | |
| 2010/0103346 | A1 * | 4/2010 | Ajichi et al. .................... | 349/62 |
| 2010/0271807 | A1 | 10/2010 | Chiu et al. | |

* cited by examiner

LIGHT EMITTING DEVICE FOR BACKLIGHT DEVICE AND METHOD OF OPERATING THE LIGHT EMITTING DEVICE

CROSS-REFERENCE TO PRIOR APPLICATIONS

This application is the U.S. National Phase application under 35 U.S.C. §371 of International Application No. PCT/IB13/050480, filed on Jan. 18, 2013, which claims the benefit of U.S. Provisional Patent Application No. 61/590,393, filed on Jan. 25, 2012. These applications are hereby incorporated by reference herein.

BACKGROUND OF THE INVENTION

The use of multiple light emitting diodes (LEDs) becomes more and more common for creating the required amount of light for displays such as TVs and monitors. The LEDs usually form a panel referred to as a backlight device, which is intended to provide a homogenous light to the back surface of the display. LEDs of different colours are usually put in clusters so that the combined light of the cluster meets specific demands, e.g. such that the mixed light from the LEDs of each cluster form the same target white point. As an example, clusters or rows of RGBG-coloured LEDs may be used, in which R refers to a red LED, G refers to a green LED and B refers to a blue LED.

Most backlights are either “edge-lit” or “back-lit”, which differ in the placement of the LEDs relative the display. In an edge-lit backlight, the LEDs are positioned along the border of the backlight, and a light guide is used to direct the light from the LEDs such that the display is illuminated, whereas the LEDs of a back-lit backlight (also referred to as a “direct-lit” backlight) are positioned directly behind the display or output area. There are growing demands for increasing the gamut, or colour gamut, of displays while at the same time decreasing the bezel, which is the dark edge around the active area of the display. Further, there are growing demands in making the displays as slim as possible. However, problems arise when all these demands are to be met. For example, the colour of the individual LED nearest the edges of the display is usually visible when viewing the display, due to insufficient colour mixing at the edge. In an RGBG system, this may for example result in a display having too much red at one edge and too much green at the opposite edge. In a backlit backlight, the corners of the display may have colours that even further deviates from a selected white point due to the insufficient colour mixing.

A solution to this problem is proposed in U.S. Pat. No. 7,671,832, in which the white point of the clusters of LEDs at the edges are colour-shifted based on the centers of gravity of the colours of the clusters, i.e. the effect is minimized by shifting the colour of the cluster at the edge to the opposite colour.

SUMMARY OF THE INVENTION

It is an object of the present invention to provide an improvement of the above techniques and prior art.

The above object is provided according to a first aspect of the invention by means of a light emitting device for illuminating a backlight device. The light emitting device comprises an array of light sources arranged with alternating first and second light sources, the first light sources emitting light of a first colour and the second light sources emitting light of a second colour. The device further comprises at least one reflector arranged along an edge of the array of light sources. The combined intensity of at least one light source arranged adjacent to the at least one reflector and its virtual image in the reflector is about 80-120% of the average intensity of the light sources of the same colour which are not arranged adjacent to the at least one reflector.

In the present disclosure, a light source “arranged adjacent to the at least one reflector” is also referred to as an “edge light source”, and a light source “of the same colour not adjacent to the at least one reflector” is also referred to as a “center light source”.

An “edge of an array” may for example be an edge light source or the row of light sources if the array is a single row of light sources, or it may be an outer row or column of a two-dimensional array of light sources.

At least one light source arranged adjacent to the reflector may thus be at least one light source arranged closest to the reflector.

The array of light sources “arranged with alternating first and second light sources” refers to an array of light sources in which every other light source in a row of the array is of a first type of light source and every other light source in the rows is of a second type of light source. Thus, in a row of the array, every light source of the first type, except for the edge light sources, is adjacent to two light sources of the second type, and vice versa. Further, if the array is a two-dimensional array with light sources arranged in rows and columns, the array may be arranged with alternating first and second light sources both along the rows and columns, i.e. forming a two-dimensional pattern of alternating first and second light sources. However, the distance between light sources in a column may be different from the distance between light sources in a row. For example, the distance between light sources in a column may be larger than the distance between light sources in a row.

The light sources of at least one row of the array may be arranged in clusters with a first and second light source in each cluster. Thus, a row of the array may comprise an equal number of first and second light sources.

A light source emitting light of a first or second colour refers to light sources emitting light of different spectra, i.e. the first colour is different from the second colour. However, the spectra of the emitted light from individual light sources of the same colour do not have to be identical in order for emitting light of the same colour. In other words, two light sources referred to as “purple” may have slightly different emission spectra. Further, two different spectra providing two different colours may have some overlap.

Preferably, the first and second light sources are selected such that the combined light of a first and second light source has a white point. As an example, if the light sources are arranged in clusters with a first and second light source in each cluster, the clusters may be arranged to have a common target white point. A white point, or reference light, may be identified by having a specific correlated colour temperature (CCT) in Kelvin.

A reflector may for example be an edge or inner wall of a backlight system, wherein the edge or inner wall has reflective properties and is adjacent to the light sources.

It is to be understood that in the light emitting device of present invention, the combined intensity of the at least one light source arranged adjacent to the at least one reflector and its virtual image in the reflector is about 80-120% of the average intensity of the light sources of the same colour which are not arranged adjacent to the at least one reflector under operation of the light emitting device, i.e. when the light sources are “turned on”. In other words, the light sources of the light emitting device may be arranged such that during operation of the light emitting device, the combined intensity of the at least one light source arranged adjacent to the at least one reflector and its virtual image in the reflector is about 80-120% of the average intensity of the light sources of the same colour which are not arranged adjacent to the at least one reflector.

The first aspect of the invention uses the insight that the light reflected in a reflector, such as the light reflected in an inner wall adjacent to the light sources of a backlight, may be utilized for enhancing the homogeneity of the light emitted by the device. Selecting and driving the light sources at (or near) the reflector or mirror plane such that the combined intensity of the light source and its virtual image is about 80-120% of the average intensity of the light sources of the same colour that are not near an edge ensures that a uniform repetitive pattern is formed. If the reflector has a perfect reflection (reflectivity), the intensity of the light source at the edge of a one-dimensional array of light sources is half of the average intensity of the central light sources. In other words, the intensity of at least one light source arranged closest to the at least one reflector is such that the reflector and the array of light sources create an infinite array of real plus virtual light sources having constant intensity near a reflector edge of e.g. a backlight unit, which results in an enhanced homogeneity near the edge of the backlight display. Thus, the light emitting device according to the first aspect of the invention provides an improved homogeneity of the light at the edges of the array of light sources used for illuminating the backlight display, which in turn results in a more uniform colour of the backlight display.

The inventor has further realised that in order to create such infinite repetitive patterns when including the light from the mirrored light sources, the array light sources has to consist of light sources of two different colours. Thus, the first aspect of the invention is also advantageous in that it only requires two types of light sources instead of e.g. clusters of RGBG-light sources. This also reduces secondary problems associated with the use of RGBG-light sources. As an example, if a prior art backlight comprises RGBG clusters, the system has an enhanced green colour at the right edge since the G light source and its virtual image form two adjacent green light sources. Even if the intensities of the colours of the light sources close to the edge are adjusted, the pattern of light sources and its reflections will not be uniform, i.e. RGBG will be mirrored as GBGR, and no uniform repetitive pattern may be formed. Consequently, the inventors insight of using a two-colour system and adjusting the intensity of the light sources at the edge facilitates formation of a nearly perfect repetitive sequence of light sources.

Further, in order to obtain an edge light source with different intensity compared to a center light source, the individual light sources may be individually controlled, e.g. by means of a control unit. The control unit may thus be arranged to drive the edge light sources with different power compared to the center light sources, e.g. by adjusting a current used to drive the light sources such that the current through the edge light sources is different compared to the current through the center light sources.

In embodiments of the first aspect of the invention, the combined intensity of the at least one light source arranged adjacent to the at least one reflector and its virtual image in the reflector may be about 90-110%, such as 95-105%, such as 99-101%, of the average intensity of the light sources of the same colour which are not adjacent to the at least one reflector.

Preferably, the combined intensity of the at least one light source arranged adjacent to the at least one reflector and its virtual image in the reflector may equate the average intensity of the light sources of the same colour which are not adjacent to the at least one reflector. However, it will be appreciated that some slight deviations due to practical reasons may be observed but still providing the advantage of the present invention, i.e. improving uniformity of the light emitted from the light emitting device.

In embodiments of the first aspect of the invention, the at least one reflector may be arranged substantially perpendicular to the array of light sources. If for example the array of light sources is a row of light sources, the at least one reflector may be arranged substantially perpendicular to the row of light sources.

In embodiments of the first aspect of the invention, the intensity of the light source adjacent to the reflector, expressed as $I_{edge}$, may be obtained according to:

$$I_{edge}=I_{center}/(1+R)$$

in which $I_{center}$ is the average intensity of the light sources of the same colour which are not adjacent to the at least one reflector, and R is the reflectivity of the reflector. Thus, the inventor has come to the insight that the intensity of the edge light sources is advantageously adjusted by taking the reflectivity of the reflector into account. As discussed above, if the reflector is a perfect mirror, i.e. having 100% reflectivity, then $I_{edge}=I_{center}/2$. It will be appreciated that the reflector may not have a 100% reflectivity and any such deviation may be compensated for.

In embodiments of the first aspect of the invention, the array of light sources is a one-dimensional row of light sources. Thus, the light sources may be arranged in a row, i.e. be a linear array. This embodiment may thus correspond to an edge lit backlight in which at least one reflector is an inner wall of the backlight adjacent to the array of sources.

In embodiments of the first aspect of the invention in which the array of light sources forms a one dimensional array, the reflector extends substantially perpendicular to the row of light sources from a position on an imaginary axis drawn through the row of light sources, which position is substantially the same position on the axis as the center of one of the light sources arranged at an end of the row. Further, in this embodiment, the intensity of the light source arranged at an end of the row, expressed as $I_{edge}$, may be obtained according to:

$$I_{edge}=I_{center}$$

wherein $I_{center}$ is the average intensity of the light sources of the same colour which are not arranged at the end of the row. This embodiment thus corresponds to the example of a reflector located at the same "horizontal position" as the edge light source, if the light sources are arranged along a horizontal row. In this case, half of the emitted light from the edge light source may not reflected by the reflector, i.e. only half of the emitted light "sees" and is reflected by the reflector. Half of the emitted light thus combines with the virtual light in the reflector to a single light source of the same intensity as a center light source, which thus facilitates the formation of an infinite array of virtual and real light sources. In other words, due to the fact that the mirror may be positioned "above" the edge light source if the array is arranged as a horizontal row, only half of the light of the emitted light from the edge light source may be reflected inside the system whereas the other half may be lost, which means that the "effective" $I_{edge}$ may still be half of $I_{center}$.

The reflector may also extend substantially perpendicular to the row of light sources from a position on the imaginary axis drawn through the row of light sources, wherein the position is between the outer edge of the edge light source and the center of the edge light source. In such embodiments, about 50-100% of the light of the LED may be reflected in the reflector and consequently, the intensity of the edge light source is such that the combined intensity of the at least one light source arranged adjacent to the at least one reflector and its virtual image in the reflector is about 80-120% of the average intensity of the center light sources of the same colour. For example, if the light is coupled in a light guide or backlight, the amount of directly incoupled light of the light source into the light guide plus the amount of light incoupled via the reflector are together substantially the same as the average intensity of the center light sources of the same colour.

In embodiments of the first aspect of the invention, the distance between the center of a first light source and the center of a second light source adjacent to the first light source may be p and the distance from the at least one reflector to the edge of the at least one light source arranged adjacent to the reflector may be d. The relation between d and p may be such that $d<0.5p$, and preferably $d<0.25p$.

Further, the relation between d and p may be such that $d<0.1p$, e.g. $d<0.05p$. An advantageous value for p may be 10 mm, and the light source may be about 1 mm wide. With $d<0.1p$, the light source may be positioned at the mirror or reflector.

As an example, d may be the distance in the direction along the array of the light sources. Thus, the light sources may be positioned with a pitch p, i.e. be distanced with distance p from each other, and it is then advantageous to arrange the reflector such that the distance from the at least one reflector to the at least one light source arranged adjacent to the reflector in the direction along the array of the light sources is $0<d<0.5p$, preferably $0<d<0.25p$, more preferably $0<d<0.1p$. Further, if the light sources are arranged in clusters, the distance between two clusters p' may be about 2p. If p' is equal to or about 2p, then all light sources are arranged in a continuous row with substantially the same distance between all light sources which facilitates forming a repetitive pattern of light sources.

In embodiments of the first aspect of the invention, the array of light sources is a two-dimensional array of light sources. Thus, the array may be light sources arranged in rows and columns. This embodiment may thus correspond to backlit (direct-lit) backlight in which the reflector or reflectors may be one or several of the edges of the backlight adjacent to the array of sources.

As an example, the device may comprise at least a first type of reflector of reflectivity R1 extending along at least a first outer row of the array of light sources, and at least a second type of reflector of reflectivity R2 extending along at least a second outer row of the array of light sources, the second outer row of light sources extending in another direction compared to the first row of light sources. Further, in the present example, the intensity of a light source in a row adjacent to a first type of reflector, expressed as $I_{edge1}$, may be obtained according to:

$$I_{edge1}=I_{center}/(1+R1).$$

Further, in the present example, the intensity of a light source in a row adjacent to a second type of reflector, expressed as $I_{edge2}$, may be obtained according to:

$$I_{edge2}=I_{center}/(1+R2).$$

Further, in the present example, the intensity of a corner light source, which is adjacent to both a first type and a second type of reflector and expressed as $I_{corner}$, may be obtained according to:

$$I_{corner}=I_{center}/(1+R1+R2+R1*R2).$$

In the present example, $I_{center}$ is the average intensity of the light source of the same colour which are not in a row adjacent to any reflector. R1 and R2 are the reflectivities of the two mirror planes formed by the first and second reflectors, respectively. The inventor has realised that in a two-dimensional array, the intensity of the light sources at the corners of the array may advantageously be compensated for reflectivities in both the first and second reflectors.

The first row of light sources may be substantially perpendicular to the second row of light sources, which means that the first type of reflector may be arranged substantially perpendicular to the second type of reflector. As an example, the device may comprise two of the first type of reflectors and two of the second type of reflectors. However, all edges of the array may also each be adjacent to reflectors of different types.

Further, the reflectors may form an enclosed area and the array may be arranged within the enclosed area. Thus, the reflectors may "surround" the two-dimensional array of light sources, as is the case for most of the backlit backlight displays. The enclosed area may for example be a rectangular or quadratic area.

In embodiments of the first aspect of the invention, the light sources are light emitting diodes (LEDs).

LEDs have a number of advantageous properties. For example, the LEDs may be selected such that they have the required luminous flux, or can be driven electrically at a lower power to achieve the required luminous flux, or a combination of these two methods.

In embodiments of the first aspect, the first and second colours may be purple (P) and green (G), respectively. If LEDs are used, the purple LED may for example be obtained using a combination of a blue die with a red phosphor or a combination of a red and blue die in a single package.

As a further example, the first and second colours may be red (R) and cyan, respectively.

As a further example, the first and second colours may be blue (B) and yellow, respectively. In embodiments of the first aspect of the invention, the device further comprises at least one sensor for measuring the colour and/or intensity of at least one light source arranged adjacent to at least one reflector.

The present embodiment is advantageous in that it provides for adjusting e.g. the intensity of the light sources, e.g. by adjusting the current through a LED if a LED is the light source. Consequently, sensors may be added to the device for measuring the colour at the edges and e.g. also at the center of the display, and the intensity of the light sources may be adjusted accordingly, e.g. by adjusting the current through a LED. The present embodiment is advantageous in that it improves the stability of the light emitting device, in particular for obtaining a stable colour point over the entire life of the system.

According to an embodiment, there is provided an edge-lit or direct-lit backlight device comprising a light emitting device according to any one of the preceding embodiments, wherein at least one reflector is at least one inner wall of the backlight device arranged adjacent to the array of light sources. Thus, according to the present embodiment, one or several inner walls surrounding the array of light sources, or surrounding a light guide used for coupling the light from the light sources, may act as a mirror, reflecting the light from at least the light source adjacent to the inner wall. The present embodiment is advantageous in that it provides backlight displays having an increased homogeneity in terms of e.g. colour and brightness.

The edge-lit or direct-lit backlight device may for example be edge-lit LCD monitors or TV:s or backlit (direct lit) LCD monitors or TV:s.

According to a second aspect of the invention, there is provided a method of operating a light emitting device for illuminating a backlight device. The light emitting device comprises an array of light sources and at least one reflector arranged along an edge of the array of light sources. The array of light sources is arranged with alternating first and second light sources, the first light sources emitting light of a first colour and the second light sources emitting light of a second colour. The method comprises adjusting the intensity of at least one light source arranged adjacent to the at least one reflector such that the combined intensity of the at least one light source arranged adjacent to the at least one reflector and its virtual image in the reflector is about 80-120% of the average intensity of the light sources of the same colour which are not arranged adjacent to the at least one reflector.

The terms and definitions used in the second aspect of the invention are the same as discussed in relation to the other aspects of the invention above. In analogy with the first aspect of the invention above, a method according to the second aspect provides for a more uniform colour of the backlight display.

It will be appreciated that the features of the embodiments described with reference to the first aspect of the invention are also combinable with the method as defined in accordance with the second aspect of the invention.

Further features of, and advantages with, the present invention will become apparent when studying the appended claims and the following description. Those skilled in the art realize that different features of the present invention can be combined to create embodiments other than those explicitly described in the following.

BRIEF DESCRIPTION OF THE DRAWINGS

This and other aspects of the present invention will now be described in more detail, with reference to the appended drawings showing currently preferred embodiments of the invention.

FIG. 1_b_ shows a light emitting device in which a reflector is arranged substantially at the same position in the direction along the array of light sources as the center of the light source closest to the reflector.

DETAILED DESCRIPTION OF THE EMBODIMENTS

Figure 1A:
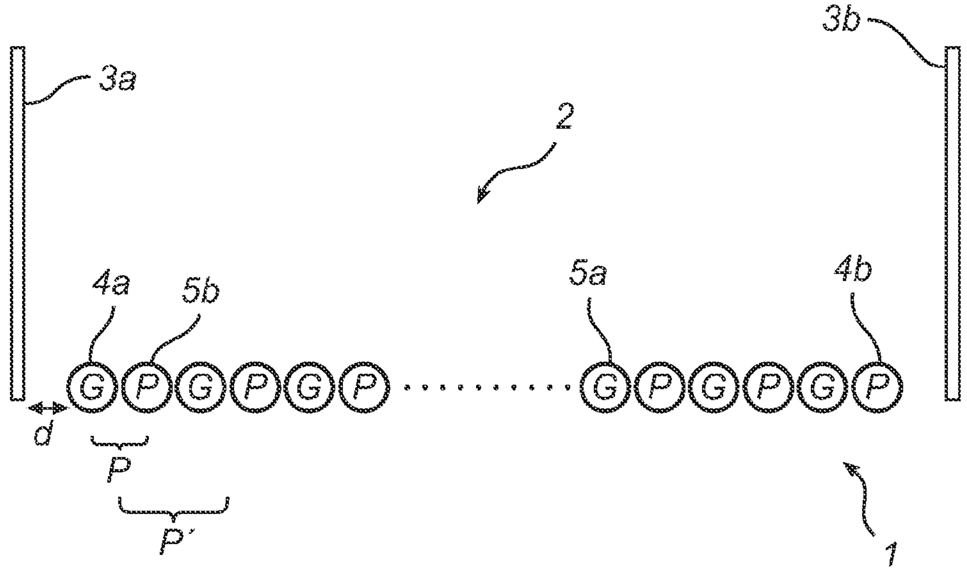
FIG. 1_a_ shows a light emitting device comprising a one-dimensional array of light sources.
Figure 1B:
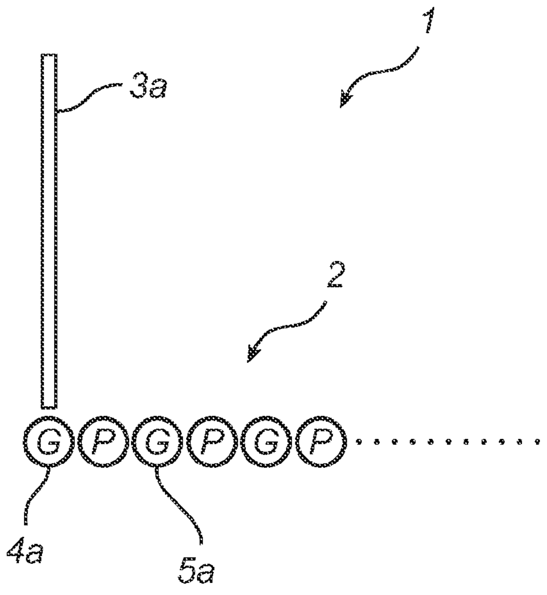

FIG. 1_a_ shows an embodiment of a light emitting device 1, which for example may be used for illuminating an edge lit backlight display. The device 1 comprises an array of LEDs 2, in this case a one-dimensional array of alternating green (G) and purple (P) LEDs. In this example, the LEDs are arranged in clusters, which means that one green LED and one purple LED forms a cluster, e.g. green LED 4_a_ and purple LED 5_b_ forms a single cluster. The LEDs are spaced with a distance, or pitch, p, within a cluster and the clusters are spaced with a distance p'. Since in this case all LEDs are spaced equally, distance p'=2p. The green (G) and purple (P) LEDs are selected such that the combined light of the clusters form a common white point. The light emitting device further comprises a first reflector 3_a_ of reflectivity Ra, in this case a first inner wall arranged along the left end or edge of the array of LEDs 2, and a second reflector 3_b_ of reflectivity Rb, in this case a second inner wall arranged along the right end or edge of the array of LEDs 2.

For edge lit systems, a plastic transparent plate functioning as a light guide may be positioned along the array of LEDs at a position "above" the array of LEDs, i.e. such that the plate would cover or shield the array of LEDs 2 when viewed from above such as in FIG. 1_a_. The light of the LEDs may then be coupled into the edge of the plate that faces the array of LEDs.

Reflector 3_a_ is spaced at a distance d from the edge LED of the array, i.e. the LED located closest to the reflector 3_a_. Preferably, d<0.5p, and more preferably d<0.25p, and even more preferably d<0.1p.

The array of LEDs comprises an edge LED 4_a_ which is green and is closest to, or adjacent to, the first reflector 3_a_, and an edge LED 4_b_, which is purple and adjacent to the second reflector 4_b_. The rest of the LEDs of the array, which are not adjacent to any reflector, are considered as "center LEDs", exemplified e.g. with a center purple LED 5_b_ and a center green LED 5_a_. The respective intensities of the edge LEDs 4_a_ and 4_b_ are adjusted such that the combined intensity of an edge LED and its virtual image in the reflector is within 80-120% of the average intensity of the center LEDs of the same colour. The intensity of the edge LEDs 4_a_ and 4_b_ may for example be adjusted by means of adjusting the current used to drive the edge LEDs 4_a_ and 4_b_, such that the current through the edge LEDs 4_a_ and 4_b_ is different compared to the current through the center LEDs 5_a_ and 5_b_. This may for example be achieved by means of a control unit (not shown).

This means that, if the average intensity of center green LEDs is $I_{G,5a}$ and the intensity of edge green LED 4_a_ is $I_{G,4a}$, then preferably $I_{G,4a}=I_{G,5a}/(1+R_a)$. If for example reflector 3_a_ has a 100% reflectivity, i.e. if Ra=1, then $I_{G,4a}=I_{G5a}/2$.

In analogy, if the average intensity of the center purple LEDs is $I_{P,5b}$ and the intensity of edge purple LED 4_b_ is $I_{P,4b}$, then $I_{P,4b}=I_{P,5b}/(1+R_b)$. If for example reflector 3_b_ has a 100% reflectivity, i.e. if Rb=1, then $I_{P,4b}=I_{P,5b}/2$.

Thus, the array of LEDs of the light emitting device 1 will, when taking into account the light reflected in the reflectors and assuming that the reflectors both have 100% reflectivity, form the following repetitive colour pattern:

G*, P*, (½G*+½G), P, G, P, . . . G, P, G, (½P+½P*), G*, P* in which G represents the green light with intensity G, P represents the purple light with intensity P, G* represents the reflected green light of intensity G and P* represents the reflected purple light with intensity P. Thus, the edge green LED (½G) of half the intensity of a center green LED will together with its mirrored light (½G*) be seen as a green LED of intensity G, i.e. (½G*+½G) in the pattern above. In analogy, the edge purple LED (½P) of half the intensity of a center green LED will together with its mirrored light (½P*) be seen as a purple LED of intensity P, i.e. (½P+½P*) in the pattern above.

FIG. 1_b_ shows an example of a light emitting device 1 similar to the device of FIG. 1_a_, but in which device only the first reflector 3_a_ and the array 2 are shown. In this embodiment, the reflector 3_a_ is located substantially at the same position as the center of the LED 4_a_ adjacent to the reflector 3_a_ on an imaginary axis drawn through the array 2 of LEDs. In other words, if the row of LEDs 2 is seen as a horizontal row, the reflector 3*a* is positioned at the same horizontal position as the center of the edge LED 4*a*, but shifted in the vertical direction compared to the edge LED 4*a*. Thus, in this embodiment, only half of the edge LED 4*a*, in this case a green (G) LED, "sees" the reflector, i.e. only about 50% of the emitted light from LED 4*a* is reflected by the reflector 3*a*. This means that if the intensity of the edge green LED 4*a* closest to the reflector is $I_{G,4a}$ and the average intensity of the center green LEDs is $I_{G,5a}$, then $I_{G,4}=I_{G,5a}$ in order for the array of LEDs to form an infinite array of real plus virtual light sources having constant intensity near the reflector edge. An example of a center green LED is denoted 5*a*.

Figure 2:
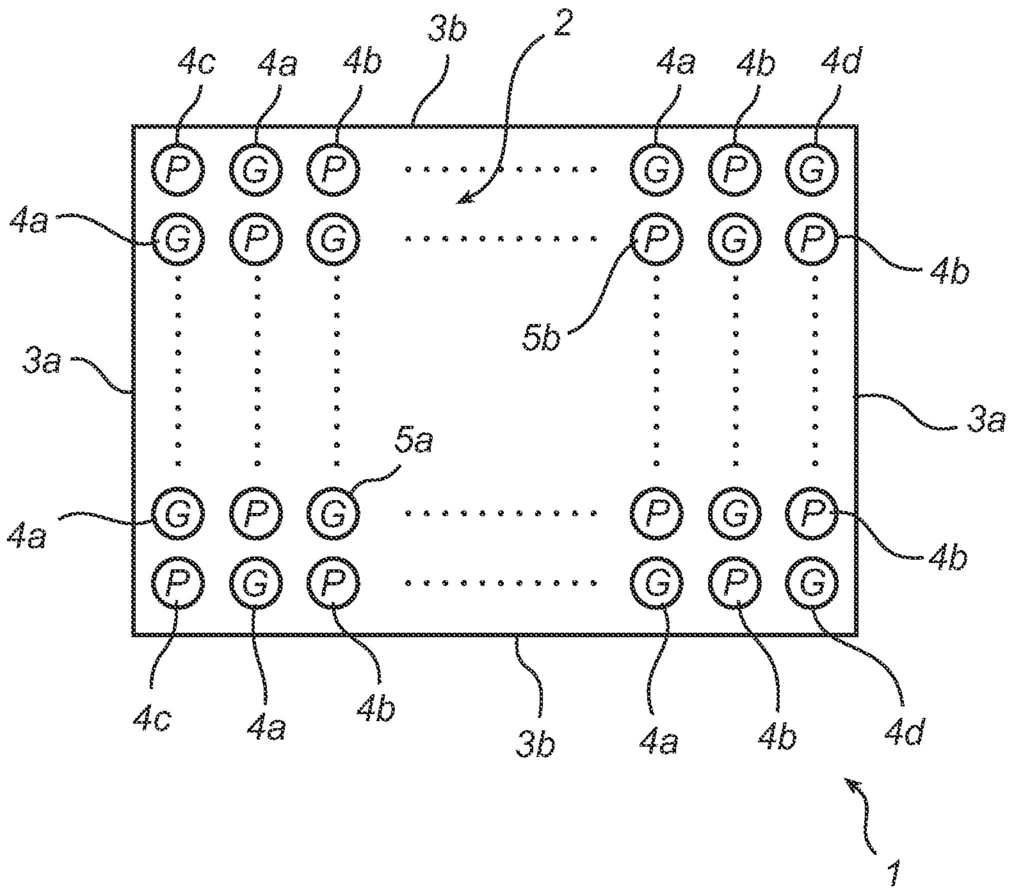
FIG. 2 shows a light emitting device comprising a two-dimensional array of light sources.

FIG. 2 shows an embodiment of a light emitting device 1 in which the array of light sources 2, in this case LEDs, is arranged as a two-dimensional array. The device of FIG. 2 may for example be used for illuminating a backlit backlight display. The two-dimensional array 2 comprises an array of alternating green (G) and purple (P) LEDs, which, in analogy with the devices of FIGS. 1*a* and 1*b*, means that one green LED and one adjacent purple LED in a row forms a cluster. The green (G) and purple (P) LEDs are selected such that the combined light of the clusters in a row form a common white point when all the LEDs are turned on. Further, the array is arranged such that both the horizontal and vertical rows have alternating green and purple LEDs, i.e. a vertical row of the array 2 has alternating green and purple LEDs and a horizontal row of the array 2 has alternating green and purple LEDs. The distance between LEDs in a horizontal row of the array 2 may be the same as the distance between LEDs of a vertical row (column) of the array 2, or the distance between LEDs in a horizontal row of the array 2 may be different from the distance between LEDs of a vertical row (column) of the array 2.

In the embodiment shown in FIG. 2, the LEDs are arranged with an equal number of green and purple LEDs in each row, i.e. the LEDs in a row are arranged in clusters with two LEDs in each cluster, but the array has an unequal number of green and purple LEDs in the columns. Thus, the LEDs in a column do not necessarily have to be arranged in clusters even though the LEDs in a row are arranged in clusters. It is however to be understood that also each column could have an equal number of green and purple LEDs such that clusters with two LEDs in each cluster may be formed in both the rows and the columns of the array 2.

The light emitting device further comprises two reflectors 3*a* of reflectivities Ra and two reflectors 3*b* of reflectivity Rb. However, it is to be understood that the left reflector 3*a* may also have a different reflectivity than the right reflector 3*a*, and the top reflector 3*b* may also have a different reflectivity than the bottom reflector 3*b*. In other words, opposite reflectors may have different reflectivities.

The reflectors are arranged such that they surround the array of LEDs, and the reflectors 3*a* are substantially parallel with the vertical rows of LEDs of the array 2, and the reflectors 3*b* are substantially parallel with the horizontal rows of LEDs of the array. This means that the reflectors 3*a* and 3*b* form a rectangular or quadratic area within which the array 2 of LEDs is disposed. The reflectors 3*a* and 3*b* are in this case inner walls of the device that are located adjacent to the edges of the array of LEDs.

The two dimensional array 2 of LEDs comprises four "corner" LEDs, two of which are green 4*d* and two of which are purple 4*c*. Each corner LED 4*c* and 4*d* is adjacent to both a reflector 3*a* and a reflector 3*b*. The rest of the green LEDs 4*a* in a horizontal or vertical edge row are adjacent to one of the reflectors 3*a*, 3*b* and the rest of the purple LEDs 4*b* in a horizontal or vertical edge row are adjacent to one of the reflectors 3*a*, 3*b*. The rest of the LEDs of the array, which are not adjacent to any reflector, are considered as "center LEDs", exemplified e.g. with a center purple LED 5*b* and a center green LED 5*a*.

The intensity of the corner LEDs 4*c* and 4*d* and the edge LEDs 4*a* and 4*b* is adjusted such that the combined intensity of a corner LED and its virtual image in the reflector more or less equates the average intensity of the center LEDs of the same colour and the combined intensity of an edge LED and its virtual image in the reflector more or less equates the average intensity of the center LEDs of the same colour.

The intensity of the corner LEDs 4*c* and 4*d*, as well as the intensity of the edge LEDs 4*a* and 4*b*, may for example be adjusted by means of adjusting the current used to drive the corner LEDs 4*c* and 4*d* and the current used to drive the edge LEDs 4*a* and 4*b*. In this way, the current through the corner LEDs 4*c* and 4*d* may be different compared to the current through the center LEDs 5*a* and 5*b*, and the current through the edge LEDs 4*a* and 4*b* may be different compared to the current through the center LEDs 5*a* and 5*b* and may further be different compared to the current through the corner LEDs 4*c* and 4*d*. Adjusting the currents through the LEDs may for example be achieved by means of a control unit (not shown).

This means that, if the average intensity of the center green LEDs is $I_{G,5a}$ and the intensity of a corner green LED 4*d* is $I_{G,4d}$, then $I_{G,4d}=I_{G,5a}/(1+R_a+R_b+R_a*R_b)$ . In analogy, if the average intensity of the center purple LEDs is $I_{P,5b}$ and the intensity of a corner purple LED 4*c* is $I_{P,4c}$, then $I_{P,4c}=I_{P,5b}/(1+R_a+R_b+R_a*R_b)$.

Thus, for the corner LEDs 4*c*, 4*d* of the two dimensional array 2, the intensity is adjusted such that reflections in both reflectors are taken into account.

In other embodiments, the left reflector 3*a* has a reflectivity Ra that is different than the reflectivity Ra' of the right reflector 3*a*, and the top reflector 3*b* has a reflectivity Rb that is different than the reflectivity Rb' of the bottom reflector 3*b*. In such a case, the intensities of the corner LEDS may be adjusted such that the intensity of the corner green LED 4*d* at the top right is $I_{G,4d,\ top\ right}$ and $I_{G,4d,\ top\ right}=I_{G,5a}/(1+R_{a'}+R_b+R_{a'}*R_b)$ and the intensity of the corner green LED 4*d* at the bottom right is $I_{G,4d,\ bottom\ right}$ and $I_{G,4d,\ bottom\ right}=I_{G,5a}/(1+R_{a'}+R_{b'}+R_{a'}*R_{b'})$. Further, the intensities may be adjusted such that the intensity of the corner purple LED 4*c* at the top left is $I_{P,4c,\ top\ left}$ and $I_{P,4c,\ top\ left}=I_{P,5b}/(1+R_a+R_b+R_a*R_b)$ and the intensity of the corner purple LED 4*c* at the bottom left is $I_{P,4c,\ bottom\ left}$, and $I_{P,4c,\ bottom\ left}=I_{P,5b}/(1+R_a+R_{b'}+R_a*R_{b'})$.

Further, if the average intensity of the center green LEDs is $I_{G,5a}$ and the intensity of edge green LED 4*a* is $I_{G,4a}$, then $I_{G,4a}=I_{G,5a}/(1+R)$, in which R is $R_a$ if the edge green LED 4*a* is adjacent to the reflector 3*a* and R is $R_b$ if the edge green LED 4*a* is adjacent to the reflector 3*b*. In analogy, if the average intensity of the center purple LEDs is $I_{P,5b}$ and the intensity of the edge purple LED 4*b* is $I_{P,4b}$, then $I_{P,4b}=I_{P,5b}/(1+R)$, in which R is $R_a$ if the edge purple LED 4*b* is adjacent to the reflector 3*a* and R is $R_b$ if the edge green LED 4*b* is adjacent to the reflector 3*b*.

Consequently, the two-dimensional array of FIG. 2 provides for a more uniform colour at the edges if e.g. implemented in a backlight display.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A light emitting device, comprising an array of light sources arranged with alternating first and second light sources, the first light sources emitting light of a first colour and the second light sources emitting light of a second colour;

at least one reflector arranged along an edge of said array of light sources;

wherein the combined intensity of at least one light source arranged adjacent to said at least one reflector and its virtual image in the reflector is about 80-120% of the average intensity of the light sources of the same colour which are not arranged adjacent to said at least one reflector.

2. A light emitting device according to claim 1, wherein the at least one reflector is arranged substantially perpendicular to said array of light sources.

3. A light emitting device comprising an array light sources arranged with alternating first and second light sources, the first light sources emitting light of a first colour and the second light sources emitting light of a second colour;

at least one reflector arranged along an edge of said array of light sources;

wherein the combined intensity of at least one light source arranged adjacent to said at least one reflector and its virtual image in the reflector is about 80-120% of the average intensity of the light sources of the same colour which are not arranged adjacent to said at least one reflector, wherein the intensity of the light source adjacent to said reflector, expressed as Iedge, is obtained according to:

$$Iedge = Icenter/(1+R)$$

wherein Icenter is the average intensity of said light sources of the same colour which are not adjacent to said at least one reflector, and R is the reflectivity of the reflector.

4. A light emitting device according to claim 1, wherein the array of light sources is a one-dimensional row of light sources.

5. A light emitting device according to claim 4, wherein the reflector extends substantially perpendicular to said row of light sources from a position on an imaginary axis drawn through said row of light sources, which position is substantially the same position on said axis as the center of one of the light sources arranged at an end of said row, wherein the intensity of said light source arranged at an end of said row, expressed as Iedge, is obtained according to:

$$Iedge = Icenter$$

wherein Icenter is the average intensity of said light sources of the same colour which are not arranged at the end of said row.

6. A light emitting device according to claim 1, wherein the distance from the at least one reflector to the edge of said at least one light source arranged adjacent to said reflector, expressed as d, is $$d<0.5p,$$

wherein p is the distance between the center of a first light source and the center a of the second light source adjacent to said first light source.

7. A light emitting device according to claim 1, wherein the array of light sources is a two-dimensional array of light sources.

8. A light emitting device according to claim 7, comprising at least a first type of reflector of reflectivity R1 extending along at least a first outer row of said array of light sources, and at least a second type of reflector of reflectivity R2 extending along at least a second outer row of said array of light sources, said second outer row of light sources extending in another direction compared to said first row of light sources, wherein the intensity of a light source in a row adjacent to a first type of reflector, expressed as Iedge1, is obtained according to:

$$Iedge1 = Icenter/(1+R1);$$

the intensity of a light source in a row adjacent to a second type of reflector, expressed as Iedge2, is obtained according to:

$$Iedge2 = Icenter/(1+R2); \text{ and}$$

the intensity of a corner light source, which is adjacent to both a first type and a second type of reflector and expressed as Icorner, is obtained according to:

$$Icorner = Icenter/(1+R1+R2+R1*R2),$$

wherein Icenter is the average intensity of the light source of the same colour which are not in a row adjacent to any reflector.

9. A light emitting device according to claim 8, comprising two of the first type of reflectors and two of the second type of reflectors, said reflectors forming an enclosed area and wherein said array is arranged within said enclosed area.

10. A light emitting device according to claim 1, wherein the light sources are light emitting diodes (LEDs).

11. A light emitting device according to claim 1, wherein the first and second colours are purple (P) and green (G), respectively.

12. A light emitting device according to claim 1, further comprising at least one sensor for measuring the colour and/or intensity of at least one light source arranged adjacent to at least one reflector.

13. An edge-lit or direct-lit backlight device comprising the light emitting device according to claim 1, wherein at least one reflector is at least one inner wall of said backlight device arranged along an edge of said array of light sources.

14. A method of operating a light emitting device for illuminating a backlight device, said light emitting device comprising an array of light sources arranged with alternating first and second light sources, the first light sources emitting light of a first colour and the second light sources emitting light of a second colour;

at least one reflector arranged along an edge of said array of light sources;

the method comprising adjusting the intensity of at least one light source arranged adjacent to said at least one reflector such that the combined intensity of said at least one light source arranged adjacent to said at least one reflector and its virtual image in the reflector is about 80-120% of the average intensity of the light sources of the same colour which are not arranged adjacent to said at least one reflector.

* * * * *